Figure 1:
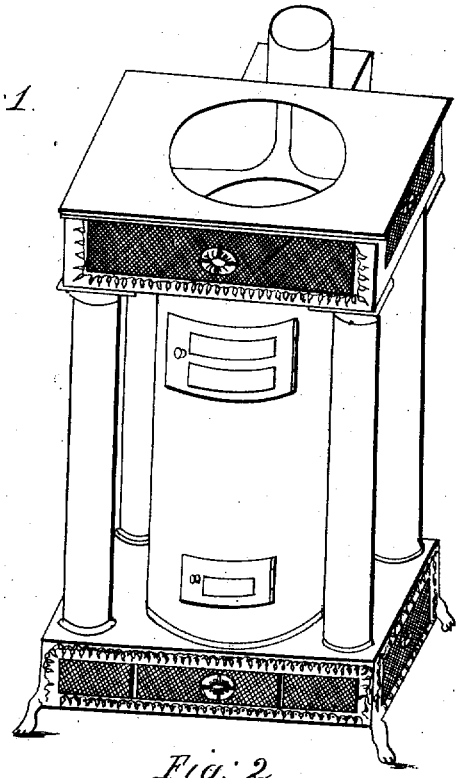
Figure 2:
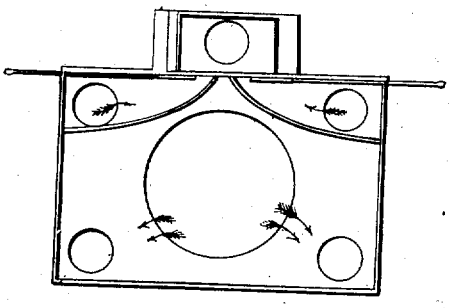
Figure 3:
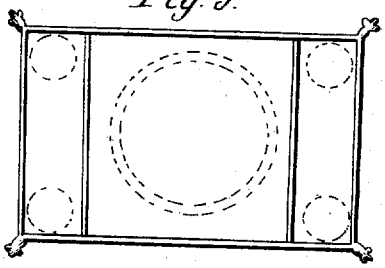

J. ATWATER.

STOVE.

8917X

Patented June 20, 1835.

an. 13
June 20. 1835

8917X

James Atwater
Letters Patent

The Schedule referred to in these Letters Patent and making part of the same containing a description in the words of the said James Atwater himself of his improvement in the common Furnace Stove used for burning hard coal Know all men by these Presents That I James Atwater of New Haven in the County of New Haven and State of Connecticut and a citizen of said State and of the United States have invented a new and usefull improvement in the common furnace stove used for burning hard coal and that the following is a full and exact description of the construction and operation of said machine as invented or improved by me. This improvement consists in certain alterations of and additions to a common furnace stove used to burn hard coal for the purpose of retaining and diffusing the heat of the fuel burned therein in a convenient and economical manner. These additions and alterations comprise a base with a chamber in each of two sides thereof an entablature with two divisions therein and sundry columns connecting the base and entablature. This base and entablature are substituted for the usual top and bottom of the stove. The cilinder of the stove, the base, entablature and columns may be formed of cast iron or other suitable metallic substance or apart from each, but I have found sheet iron for the cilinder and columns, and cast iron for the base and entablature answer a good purpose, but the whole can be made of cast iron if prefered. The base and entablature may be of any suitable shape but I have made them in the shape of an elongated cube with six plates or sides. The cylinder which contains the grates, the doors and any other usual apparatus of a common furnace stove is made to fit onto a lip formed around an opening in the base and entablature of the size of the cylinder nearly and the columns are made to fit on to lips which surround the above named openings (viz) one in the upper plate of the base and one in the lower plate of the entablature. which lips will correspond in number and and position with columns and be very nearly of the same size. The open-
ing for the cilinder being in the centre of the base and entablature and
if four columns are used the openings for them being at or near the four
corners of the base and entablature the length of the base and entablature
may be about twice the diameter of the cilinder and the breadth may a
little exceed the said diameter so that the front of the cilinder and columns
when fitted on will be in a line and set back of the front of the base and
entablature so as to make a suitable projection and give a finished ap-
pearance to the whole. The base by two partitions proceeding from front
to rear, is divided into three parts, the middle part being about three
fifths and the two parts or side chambers being each about one fifth
of the length of the base. The entablature is also divided by two partit-
tions into three parts which partitions are placed in the rear of the en-
tablature and made slightly curving and each one commences a little
in front of the opening for the two back columns and terminates very near
the middle of the back plate of the entablature so that each of the back col-
umns opens into a separate chamber divided off from the residue of the
entablature. In the rear plate of the entablature are two openings one in
each of the chambers last mentioned of any convenient size and shape to
correspond with the size of the columns which openings communicate with
a short flattened pipe or head fitted to and projecting from the rear plate of
the entablature on the upper side of which head is placed or fitted a
pipe to conduct off smoke gas &c or this pipe may be placed in any oth-
er convenient position. Each of the openings through the back plate of
the entablature leading from the two small chambers thereof has a slide
or stopper fitted to it by which the opening is partially or wholly opened
and shut and which slides are drawn out or shoved in by means of a
handle to each which passes out at the respective ends, and near the
rear of the entablature. The base has an opening in the front plate a-
bout the length of one diameter of the cilinder which receives a dust
pan in the usual way. In the top plate of the entablature I have
found it best to form an opening about the size of the cylinder and
fit a round plate to shut over the same. and which can be taken
ff

8917X

[illegible] with ease when required. In the bottom plate of the base and in the side chambers are two small openings with stoppers or slides to [illegible] shut close and open for the removal of dust or other substances. The whole should be supported by feet or other wise raising the base a suitable distance from the floor or ground. The whole being fitted together may be made firm by rods passing from the upper plate of the entablature through the columns and down through the lower plate of the base and fastened at each end in the usual way. When the slides or stoppers are drawn out and the fire kindled the smoke heated air &c passes up into all portions of the entablature except the two small chambers therein. thence down the two front columns. thence through the two side divisions or chambers of the base thence upward through the two back columns thence into the two small divisions or chambers of the entablature. thence through the spaces left open by the slides or stoppers into the head or rear of the entablature and off through the pipe attached thereto in the usual way.

Thus the heated air or draught passing through the whole of the entablature and about two fifths of the base and through the columns. the heat is transmitted by an extensive radiating surface and but little of it lost. By shutting one of the slides, one half of the columns only may be used in connection with their chambers, and the draught increased or diminished. By closing both slides the fire will be extinguished. By observing a due proportion of the parts these stoves may be made of any size or shape, and may be plain or ornamented. In the stove which I have used I have found that when the cilinder was ten inches in diameter. the columns might be 3 to 3 1/4 inches in diameter but a slight variation would be immaterial. I claim none of the above described parts of the improved stove separately taken. but I do claim the combination and arrangement of the base, the entablature, the columns & the slides or stoppers so as to be used in connection with the body a cylinder or furnace stove of the usual or of any form by means of which combination and arrangement the heat of the fuel can be brought into contact with the whole of the entablature. the whole of the columns and the side chambers of the base and diffuse through a large radiating surface or can be so regulated

8917X regulator as to pass through and radiate from only one half of the col-
umns and base, if less heat is required. In this stove the draught is
circuitous only. But I do not claim that a more circuitous draught
is new, nor that the diffusion of heat by radiation through metallic
plates or columns is my invention, but that the above described
combination and arrangement is a new and useful improvement
to accomplish the above mentioned purposes. The annexed drawings
exhibit the improved stove. Figure I. shows a front view, with the
plate to cover the opening in the upper plate of the entablature removed.
Figure II. shows a horizontal section of the entablature. Figure III.
shows a horizontal section of the base. In testimony that the foregoing
is a true and full specification of my said improvement. I have here-
to set my hand. at New Haven this nineteenth day of May A.D.
1835.

Witnesses — James Atwater
Samuel J. Hitchcock
David Kimberly — 1230 [illegible]

(Drawing.)

A. C.
Ch. J. W.